FM SYSTEM WITH PILOT SIGNAL TO MEASURE GROUP DELAY
Filed March 6, 1968
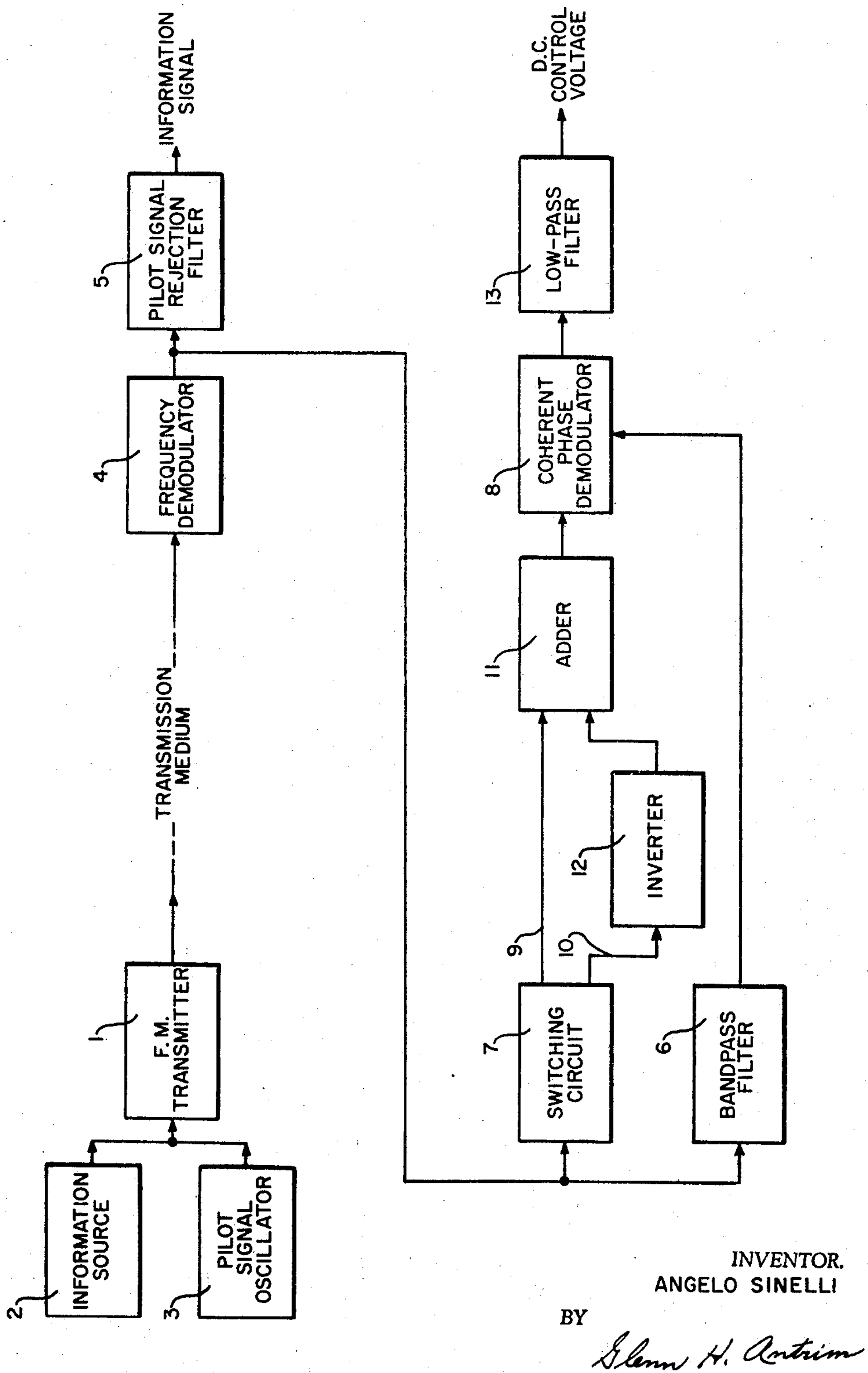
INVENTOR.
ANGELO SINELLI
BY
Glenn H. Antrim
ATTY.

United States Patent Office 3,492,583
Patented Jan. 27, 1970

3,492,583

FM SYSTEM WITH PILOT SIGNAL TO MEASURE GROUP DELAY

Angelo Sinelli, Cremona, Italy, assignor to Automatic Electric Laboratories, Inc., Northlake, Ill., a corporation of Delaware Filed Mar. 6, 1968, Ser. No. 710,957
Int. Cl. H04b 1/36
U.S. Cl. 325—67 3 Claims

ABSTRACT OF THE DISCLOSURE

The amount by which a pilot signal is phase modulated by information signals in proportion to group delay in an FM transmission system is measured continually. A bandpass filter connected to a receiver of the system filters the pilot signal to develop a reference signal having constant phase for application to an input of a demodulator or multiplier. A switching circuit, also connected to the receiver, applies to an adder a portion of the pilot signal and information signal at intervals when the instantaneous voltages are one polarity, and applies signal from the receiver through a voltage inverter to the adder during the remainder of the time when the instantaneous voltages are the opposite polarity. The output of the adder is connected to another input of the multiplier. The multiplication of the reference signal by the recombined portions of the pilot signal develops a direct-current component proportional to group delay.

Background of the invention

This invention pertains to apparatus for measuring group delay (phase changes with frequency) in wave transmission lines and networks, and particularly to apparatus for measuring group delay continually during transmission of signals and for developing voltage suitable for automatic control of equalization.

Commonly, group delay is measured only while a transmission line is removed from normal service. Signal from a sweep-frequency generator is applied to the idle transmission line to provide a panoramic output which is observed on a cathode ray tube. The observation aids in making equalizer adjustments manually to obtain flat frequency response. An arrangement for making equalizer adjustments automatically rather than manually is desirable. Normal service would not be interrupted; a technician would not have to be present to observe the display of frequency response and to make the adjustments; equalizers could readily be switched between different lines and be adjusted automatically as required for their new connections; and likewise automatic equalizers would adjust automatically to compensate for changes while they are in use in the same lines.

The measuring apparatus of this invention is an improvement of the measuring circuit described in a copending U.S. application Ser. No. 685,903 entitled "Group-Delay Measuring Apparatus" filed by Francesco Carassa on Nov. 27, 1967, and assigned to the assignee of this invention. These devices are to be used in FM transmitting systems of the type having an information source and a pilot signal for frequency modulating carrier signal which is transmitted to a remote FM receiver. The group delay measuring circuit described in the aforementioned application has three branches connected to the output of an FM demodulator of the receiver. In a first branch the pilot signal only is passed and filtered to provide a constant reference frequency. In a second branch, a diode passes only the positive portions of the carrier signal including the pilot signal; and in a similar third branch, a diode connected in an opposite sense passes only the negative portions. A coherent phase demodulator in each of the second and third branches receives a different portion of only one polarity and also the reference from the first branch. The outputs of the demodulators are combined in a differential circuit and filtered to provide a direct-current voltage proportional to phase modulation of the pilot. This direct-current voltage is proportional to the amount the transmission characteristic departs from being flat and its polarity is determined in accordance with the sign of the slope of the characteristic curve such that it is suitable for controlling an equalizer.

Summary of the invention

The present measuring circuit like that described in the prior patent application referenced above has its input connected to the output of an FM demodulator for receiving demodulated pilot signal and a band of information signals. Likewise, the input signal to the measuring circuit is applied to a bandpass filter for deriving a reference signal at the frequency of the pilot signal, and is also applied to a switching circuit for dividing the signal into instantaneous positive and negative portions.

In the circuit described previously, the positive and negative portions were applied to separate coherent phase demodulators, whereas in the present circuit one of the portions is inverted and added to the other portion, and the sum of these portions is applied to a single demodulator of the same type as used in the prior circuit. In the demodulator or multiplier, this sum is multiplied by the reference signal, and the output product of these signals is applied to a low-pass filter for deriving direct-current control voltage from low-frequency components of the product.

The circuit of the present invention like the prior circuit described above uses a single pilot tone which has constant amplitude and slightly higher frequency than the highest frequency in the band of information signals. The amount that the information signals modulate the pilot tone is proportional to the amount the phase delay characteristic of the transmission circuit over its frequency band departs from being flat.

By using a separate channel including a demodulator for each of the positive and negative outputs as described for the prior invention, undesirable variations resulting from unavoidable small changes in the phase of the reference signal, which is derived from the pilot signal, are substantially cancelled. The output of the measuring circuit of the present invention is affected even less by variations in phase of the reference signal because difference in outputs resulting from dissimilarities of the two coherent frequency demodulators or multipliers is eliminated. In addition, as described below, the average value of the frequency-modulated pilot signal, which is divided, part of it inverted, and recombined, is less than the value of the pilot signal in any of the channels of the measuring apparatus described in the aforementioned application and further differs in that it is shifted 90° with respect to the pilot signal, and is therefore in phase with the reference signal (which has been shifted in phase 90° with respect to the average phase of the incoming pilot signal). Thus, it is possible to increase the sensitivity of the measuring circuit. Also the present circuit is simpler than the prior circuit because of the elimination of a multiplier.

Brief description of the drawing

The single figure shows in a block diagram the group delay measuring device of this invention connected to a conventional FM transmitting-receiving system.

Description of the preferred embodiment

A conventional FM transmitting and receiving system is shown in the upper portion of the accompanying figure. An FM transmitter 1 supplies high-frequency carrier signal through a transmission medium to a remote receiver. The outputs of an information source 2 and a pilot signal oscillator 3 are connected to the modulation input of the transmitter. Commonly the information source 2 supplies a band of subcarrier signals which have been modulated by telephonic signals or television signals. Pilot signal oscillator 3 supplies a signal having constant amplitude at a frequency slightly higher than the highest frequency of the signal supplied by the information source 2. Signal from the FM transmitter 1 is transmitted over an antenna system or over a coaxial cable to a frequency demodulator 4 of the usual receiving system. The demodulated signals corresponding to the signals supplied by the information source 2 are applied through a pilot signal rejection filter 5 to succeeding transmission circuits.

The lower portion of the figure shows the group delay measuring arrangement of this invention. The input of a switching circuit 7 and the input of a bandpass filter 6 are connected to the output of the frequency demodulator 4 for receiving signals originally derived from the information source 2 and from the pilot signal oscillator 3.

The output of the bandpass filter 6 is connected to an input of a coherent phase demodulator 8. The filter 6 has narrow bandpass characteristics at the frequency of the pilot signal to provide an output at the frequency of the original pilot signal without substantial phase deviations, and preferably, has a circuit for shaping the reference signal into a square wave.

The switching circuit 7 may comprise two diodes connected in opposite senses as described in the prior patent application referenced above. One of these diodes, or equivalent switching element, conducts signal from the output of the frequency demodulator 4 to an output 9 of the switching circuit 7 when the instantaneous values of the combined information signal and the pilot signal are one polarity, and the other switching element conducts signal to an output 10 when the instantaneous values of the combined information signals and pilot signals are of the opposite polarity. The output 9 of the switching circuit 7 is connected directly to one input of an adder 11, and the output 10 is connected through a voltage or sign inverter 12 to the other input of the adder 11. Since the carrier signals derived from the information source 2 are much stronger than the pilot signals derived from the oscillator 3, the information signals derived from the source 2 dominate in determining which switching element of the switching circuit 7 passes signal to the respective outputs 9 and 10. Practically for the purpose of phase measurement, the modulated pilot signal is conducted from the frequency demodulator 4 through the switching circuit 7 and its output 9 to one input of the adder 11 when the instantaneous values of the information carrier signals are one polarity, and the pilot modulated signal is conducted through the switching circuit 7, its other output 10, and the inverter 12 to the other input of the adder 11 when the instantaneous values of the information carrier signals are the opposite polarity. In the adder 11, that portion of the signal that is passed without inversion is recombined with that portion of the signal which is inverted. The output of the adder 11 is connected to the other input of the coherent phase demodulator or multiplier 8.

In the demodulator 8, the reference signal from the bandpass filter 6 is multiplied by the output of the adder 11. The output of the coherent phase demodulator 8 is connected through the low pass filter 13 to direct-current control voltage circuits. The filter 13 passes only low frequency direct-current components which result from phase modulation of the pilot signal.

While information signal and pilot signal are being applied through a transmission circuit that is known to have a flat frequency characteristic, the bandpass filter 6 is adjusted to change the phase of the reference signal until the output from the low pass filter 13 is zero. After calibration, the control voltage is proportional to the amount the transmission characteristic departs from being flat and its polarity is determined by the sign of the slope of the characteristic curve. Although the control voltage may be monitored and used as a reference for manually adjusting the group delay characteristics of a transmission line, it is most suitable for application to an equalizer which adjusts the group delay of the transmission line automatically.

Let the input $e(t)$ to the FM transmitter 1 be:

$$e(t)=s(t)+E\cos\omega pt \qquad (1)$$

where $s(t)$ is the main signal from the information source 1, and $E\cos\omega pt$ is the output of the pilot signal generator 3. After the signal is transmitted over circuits that do not have absolutely flat frequency characteristics, the output $u(t)$ of the demodulator 4 is:

$$u(t)=s(t)+d(t)+E\cos[\omega pt+ks(t)] \qquad (2)$$

where $d(t)$ represents distortion independent of the presence of the pilot signal (plus possible $\cos 2\omega pt$ and higher harmonics), and the last addend represents distortion of the pilot signal resulting from phase modulation of the pilot signal by the main signal. Where the frequency $wp/2\pi$ of the pilot signal is somewhat higher than the highest frequency in the band of main signals $s(t)$, $k$ of the last addend of the Equation 2 can be shown to be:

$$k=a_1\omega_pF \qquad (3)$$

where F is frequency drift or departure in phase in pilot signal for a unitary instantaneous value of the main signal $s(t)$. Therefore, the phase modulation is proportional to $k$.

Assuming that the average value of the main signal $s(t)$ is zero, the signal must be separated into positive and negative portions in order to obtain a significant direct-current output proportional to $k$. Referring to the instantaneous signals at the output 9 of the switching circuit 7 as $u_A(t)$ and that at the output 10 of the switching circuit as $u_B(t)$, these values in the copending application referenced above were multiplied in different modulators by $\sin\omega pt$, where $\sin\omega pt$ is derived from the output of the bandpass filter 6. The output of the filter 6 is preferably a square wave with a spectrum represented by approximately $\sin\omega pt+\frac{1}{3}\sin 3\omega pt+ \dots$. Because of the low-pass filter 13, only the first term is effective to produce output when multiplied by the last term of Equation 2 above. The average output of one of the two demodulators according to the prior circuit referenced above is designated $\overline{u_A(t)\cdot\sin\omega pt}$, and the average output of the other demodulator is designated $\overline{u_B(t)\cdot\sin\omega pt}$. The difference of these average outputs of the separate demodulators is obtained by applying the outputs of the demodulators to a differential circuit. According to the present invention, the measuring circuit has been changed according to the following transformation of the expression for the average output of the differentiator;

$$\overline{u_A(t)\cdot\sin\omega_pt}-\overline{u_B(t)\cdot\sin\omega_pt}$$
$$=\overline{u_A(t)\cdot\sin\omega_pt-u_B(t)\ \sin\omega_pt}$$
$$=\overline{[u_A(t)-u_B(t)]\ \sin\omega_pt}$$

In this last expression the difference of the instantaneous signals, $u_A(t)-u_B(t)$, is derived at the output of the adder 11 for application to the coherent phase demodulator 8, and the multiplier $\sin\omega_pt$ is applied to the demodulator 8 from the bandpass filter 6.

As a result of the addition of the instantaneous values of the two signals $u_A(t)$ and $u_B(t)$ in the adder 11 of the present invention, the average amplitude of the phase modulated pilot at the input of the demodulator 8 is substantially less than the amplitude of the phase modulated pilot signal applied to each of the two coherent phase demodulators in the prior circuit described above. For moderate slopes of the group delay characteristic this decrease in amplitude is inversely proportional to the slope. However, in spite of the decreased amplitude of the phase modulated pilot signal applied to the coherent phase demodulator 8, the sensitivity is the same (and can be increased with the same multiplier design) as the sensitivity of the prior circuit because the resulting pilot signal applied from the adder 11 is on the average shifted in phase by 90° with respect to that of any individual channel, and therefore it is in phase with the reference signal. For example, in a telephone transmission system in which information in 1,800 channels and a pilot signal in a 9 mHz. channel is transmitted by a medium having a group-delay slope of 3 nsec./mHz., the amplitude of the pilot signal applied to the phase demodulator in the group delay measuring circuit of the present invention compared to the amplitude of the signals applied to the separate demodulators of the prior invention is decreased by 21 db for 68% of the time and by 9 db for 0.1% of the time with respect to the amplitude of the pilot oscillation in any individual channel.

The performance of the system according to this invention has been tested by applying to its input a pilot signal and a main signal which consists of white noise simulating 1800 telephone channels. The measured sensitivity was 0.1 volt per 0.05 ns./mHz. of group delay. The residual noise is about 0.03 volt peak to peak, and the drift of the output direct-current voltage is about ±0.1 volt over a range of 0° to 50° C.

What is claimed is:

1. A group-delay measuring device having an input for receiving a band of demodulated FM signals including a relatively weak pilot signal subject to phase modulation proportional to variation of group delay over said band comprising: a switching circuit connected to said input of said measuring device, an adder having first and second inputs and an output and operative to produce at its output the sum of the voltages applied to its inputs, the first input of said adder being connected to said switching circuit, an inverter connected between said switching circuit and the second input of said adder, said switching circuit conducting said FM signals without inversion to said first input of said adder in response to its reception of instantaneous voltage of one polarity and alternately conducting said FM signals through said inverter to said second input in response to its reception of instantaneous voltage of polarity opposite to said one polarity, reference signal means developing a reference signal at the center frequency of said pilot signal but shifted 90° in phase thereto, and multiplying means connected to said output of said adder and to said reference signal means to obtain the product of said reference signal and the summation of said pilot signal derived from said adder.

2. A group-delay measuring device as claimed in claim 1 in which said reference signal means is a narrow bandpass filter connected between said multiplying means and said input of said device.

3. A group delay measuring device as claimed in claim 1 in which the low-pass filter is connected to said multiplier to derive from the low-frequency direct-current components of said product a direct-current output voltage proportional to group-delay in said system.

References Cited

UNITED STATES PATENTS

| | | | |
|---|---|---|---|
| 2,236,134 | 3/1941 | Gloess | 333—16 XR |
| 2,284,612 | 5/1942 | Green et al. | 333—16 |
| 2,411,415 | 11/1946 | Cowley et al. | 333—16 XR |

JOHN W. CALDWELL, Primary Examiner

CARL W. VON HELLENS, Assistant Examiner

U.S. Cl. X.R.

325—47, 363; 333—16